ELECTRIC WATCH

Original Filed Dec. 19, 1958 3 Sheets-Sheet 1

INVENTORS
Harry S. Detwiler
James H. Reese
Peter J. Serlemitsos

BY
Diggins & LeBlanc
ATTORNEYS

ELECTRIC WATCH
Original Filed Dec. 19, 1958 3 Sheets-Sheet 2
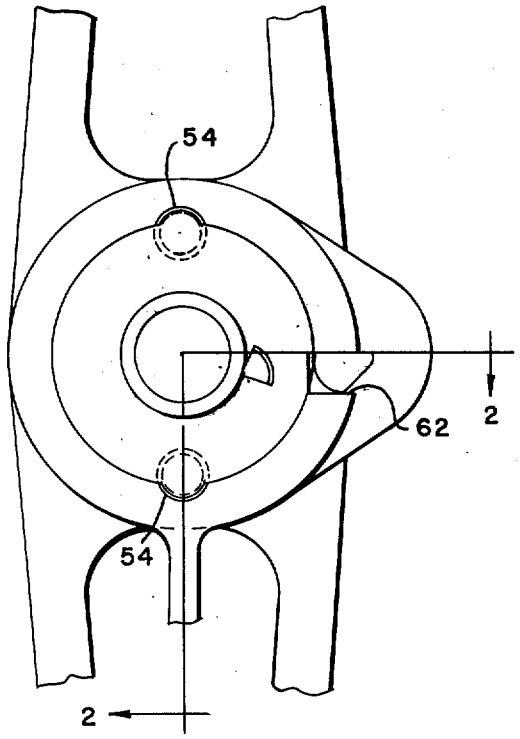
FIG. 2.
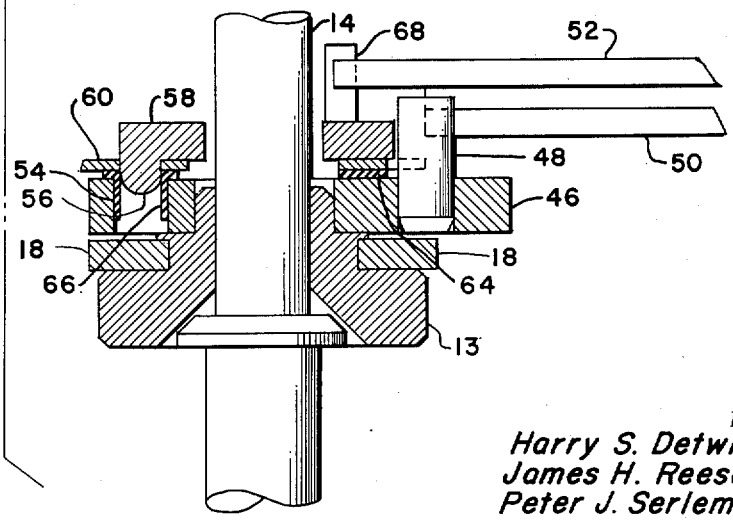
INVENTORS
Harry S. Detwiler
James H. Reese
Peter J. Serlemitsos
BY
Diggins & Le Blanc
ATTORNEYS Harry S. Detwiler
James H. Reese
Peter J. Serlemitsos
INVENTORS BY
Diggins & LeBlanc
attorneys United States Patent Office Re. 25,328
Reissued Feb. 5, 1963

25,328
ELECTRIC WATCH

Harry S. Detwiler, Lancaster, and James H. Reese, Manheim, Pa., and Peter J. Serlemitsos, College Park, Md., by The Hamilton Watch Company, Lancaster, Pa., a corporation of Pennsylvania, assignee Original No. 3,015,206, dated Jan. 2, 1962, Ser. No. 781,809, Dec. 19, 1958. Application for reissue Jan 8, 1962, Ser. No. 166,981
18 Claims. (Cl. 58—28)

Matter enclosed in heavy brackets [ ] appears in the original patent but forms no part of this reissue specification; matter printed in italics indicates the additions made by reissue.

This invention relates to battery operated electric watches having a balance wheel carrying a coil and contact and more particularly relates to an improved balance wheel-coil and contact assembly.

In the type of battery operated electric watch disclosed in assignee's copending application Serial No. 409,934, filed February 12, 1954, now Patent No. 2,888,797, and applications Serial Nos. 578,843, now Patent No. 2,972,-745, and 578,844, now Patent No. 2,954,664, both filed April 17, 1956, the train of the watch is driven by means of an impulse motor utilizing stationary permanent magnets and a coil mounted on a balance wheel. The balance staff carries a commutator arrangement which provides the necessary periodic connection of the coil to the battery. This contact system is described in detail in assignee's copending application Serial No. 551,791, filed December 8, 1955.

In the balance wheel-coil assembly shown in the last mentioned application and in the other aforementioned applications, the coil has an open center with one terminal of the winding being exposed within such center. This end of the winding is connected to a metallic bracket which is cemented to the inner surface of the coil. The bracket, in turn, is connected to a gold-silver alloy coil contact by means of a screw and the other end of this contact is mounted on a roller and adapted to engage a stationary portion of the contact system. The so-called stationary portion of the contact system acually comprises a movable spring contact member which cooperates with a second spring member which in turn is moved by means of a trip jewel carried by the roller, all as is more completely described in the aforementioned application Serial No. 557,791, now Patent No. 2,954,663.

The cementing of the bracket to the inner surface of the coil is a delicate hand operation and, in conjunction with the coil contact which is rigidly connected thereto, forms a rigid assembly suspectible of breakage upon shock to either the coil or balance wheel.

In a copending application of assignee, tthere is disclosed an improved method of mounting a coil on a balance wheel so as to minimize if not eliminate the transfer of shock from the balance wheel to the coil or vice versa. In assignee's application Serial No. 781,807, filed on even date herewith, there is shown a coil of the general type utilized in the aforementioned battery operated watches disclosed in the aforementioned applications but according to the new arrangement shown in that application, the coil is provided with a unique metal core.

According to the instant invention, it has now been found that it is possible to provide a connection between the moving contact carried by the roller and the inner terminal of the coil which is easily mounted, self-aligning and flexible, so as to prevent transfer of shock from the balance wheel to the coil or vice versa. This improved connection not only simplifies the assembly of the balance wheel-coil assembly, thereby reducing its cost, but also eliminates the possibility of subsequent damage to the assembly by preventing the transfer of shock from the balance wheel to the coil and vice versa.

It is accordingly a primary object of the present invention to provide in a battery operated electric watch having a balance wheel carried coil, an improved connection between a movable contact carried by the balance staff and a terminal of the coil.

It is another object of the invention to provide in a battery operated electric watch having a balance wheel carried coil of the foregoing type, a connection between the inner terminal of the coil and a movable contact carried by the balance staff which is flexible so as to minimize or eliminate the transfer of shock from the balance wheel or balance staff to the coil or vice versa.

It is still another object of the invention to provide in a battery operated electric watch having a balance wheel carried coil and a balance staff carried contact, an improved connection between the contact and the inner terminal of the coil which is simple in construction and easy to mount so as to reduce the cost of assembling the balance wheel, coil and contact assembly.

It is still a further object of the present invention to provide in an electric watch a balance wheel-coil contact assembly which provides for self alignment of the roller, connector and contact.

These and further objects and advantages of the invention will become more apparent upon reference to the following specification and claims and appended drawings wherein:

FIGURE 2 is a partial vertical section taken along the line 2—2 of FIGURE 1 showing the mounting of the movable contact about the balance staff;

Figure 1:
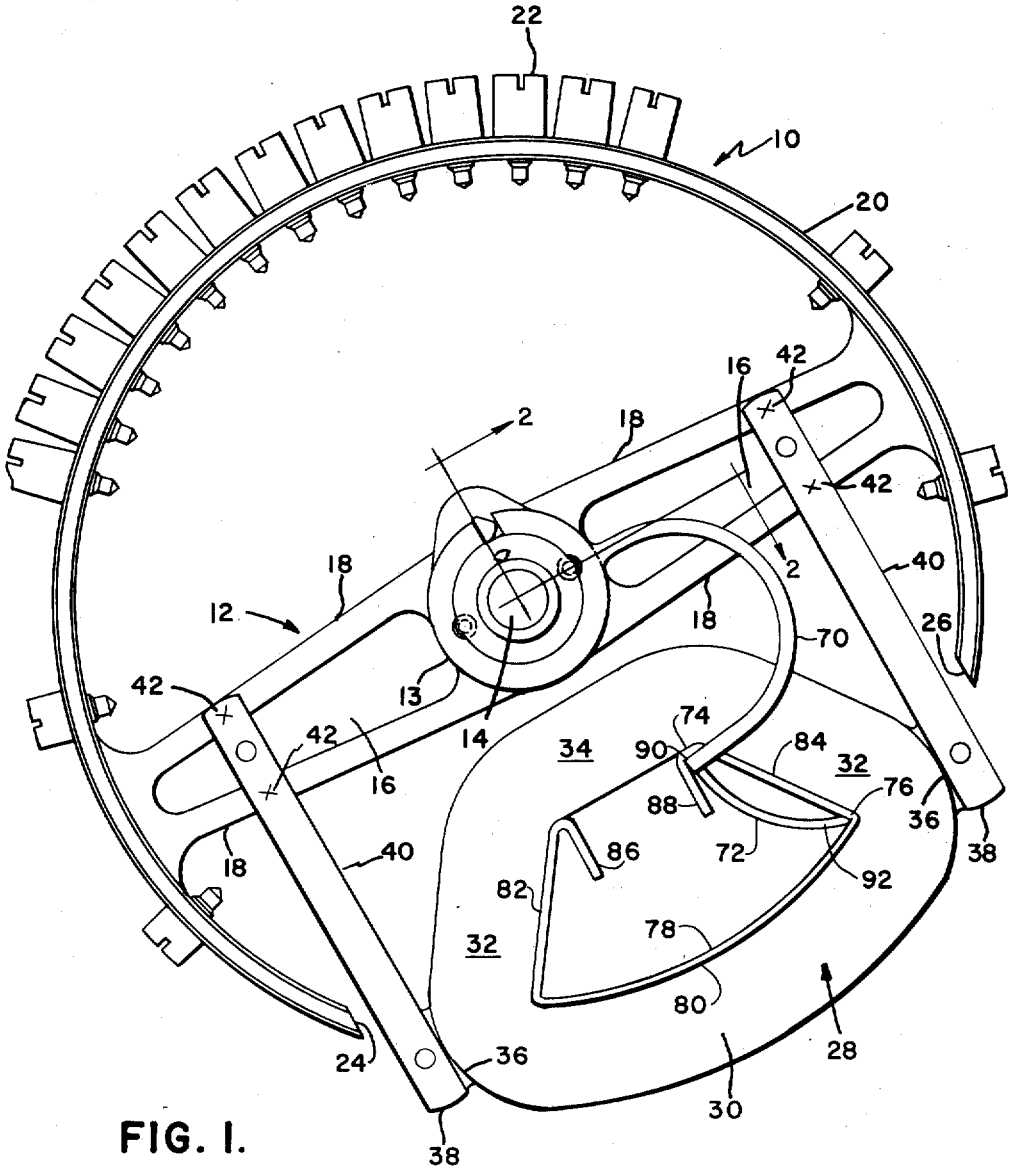
FIGURE 1 is a plan view showing a balance wheel-coil contact assembly constructed according to one embodiment of the present invention.

Referring to FIGURE 1 there is seen a balance wheel 10 having a cross-bar 12 mounted on a collet 13 on a balance staff 14. The cross-bar 12 is skeletonized at 16, so that each radial portion thereof consists of a pair of legs 18. A rim 20 is carried by the cross-bar and supports a series of poising weights 22 in a conventional manner.

The rim 20 is cut-away at 24 and 26 to provide space for mounting a pie or sector shaped coil 28. The coil 28 consists of an arcuate outer side 30, a pair of substantially radial sides 32, and a substantially straight inner side 34. It will be seen that the junctures of the radial sides 32 and the arcuate side 30 form curvate coil portions 36. Attached to each curvate coil portion 36 is one end 38 of a flat beryllium copper coil supporting bracket 40. The other ends of the coil supporting brackets 40 are attached to the legs 18 of the cross bar 12 by means of welds 42.

Referring to FIGURE 2, the collet 13 carries a brass roller 46 of the same type as described in assignee's copending application Serial No. 551,971. This roller has mounted therein a trip jewel 48 which cooperates with a trip spring 50 as is described in further detail in assignee's aforementioned copending application. Briefly, the purpose of the trip jewel is to insure accurate, even, reliable contact of the stationary spring contact member 52 with the movable contact presently to be described.

The roller 46 carries a pair of diametrically spaced apertures 54 which receive a pair of feet 56 depending from a contact hub 58 mounted on top of the roller. Interposed between the contact hub and the roller is the annular coil connector 60 which is cut away at 62 to pass the trip jewel 48. In mounting the contact hub 58 and coil connector 60, the surface of the roller 46 has applied thereto an annular coating of a resin which is preferably an epoxy resin indicated at 64. This coating extends down into the bores 54 as shown at 66. While this layer is still uncured, the connector 60 is pressed down onto it and is aligned by pressing the feet 56 on the contact hub 58 into the bores 54. The epoxy layer cements both the connector and contact hub to the roller while at the same time providing electrical insulation between these two pieces. The contact hub is preferably formed of a gold alloy to provide good electrical conductivity and has upstanding therefrom a contact finger 68 adapted to engage the contact 52 as is explained in considerable detail in the aforementioned copending application.

Figure 3:
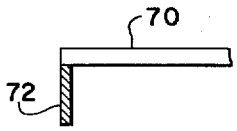
FIGURE 3 is a vertical elevation partly in section, showing the end of the improved connection.

Attached to the connector 60 as an integral portion thereof is an elongated arcuate connector arm 70 which terminates in a resilient core engaging end 72. Referring to FIGURE 3, it will be seen that the core-engaging portion 72 depends below the plane of the arcuate connector and is itself arcuate so as to be sprung between the corners 74 and 76 of a metal core 78 inside the coil 28.

The core 78 is described in further detail in assignee's aforementioned copending application Serial No. 781,807, filed December 19, 1958, and may be formed of beryllium copper. This core has an arcuate side 80 which snugly fits the inner arcuate edge of arcuate coil side 30. The core further has a pair of substantially radial legs 82 and 84 snugly engaging the inner surfaces of the radial legs of the coil. The ends of the radial legs 82 and 84 of the core are bent reversely and downwardly at 86 and 88. The upper end 90 of the end portion 72 of the connector arm resiliently engages the bend at which end 88 of the core is turned down. The other end 92 of the connector end portion 72 engages the corner 76 between the radial core side 84 and the arcuate core side 80. The resiliency and arcuate bowed shape of the end portion 72 of the connector arm provides for constant pressure between the connector ends and the core so as to provide good electrical contact therebetween. The end portion 72 is thus sprung into position.

It will be apparent that the connection between the inner terminal of the coil and the movable contact 68 carried by the roller is quite simply established by pressing the contact hub 58 downwardly so that the feet 56 enter the roller 46, thereby properly positioning the connector 60 about the staff, so that a clearance is established. At the time that the feet 56 on the connector 60 are pressed into position on the roller, the epoxy coating on the roller 46 is sill uncured so that it both insulates the connector from the roller and cements it thereto. The end portion 72 may then be bowed and snapped into position in the coil core 78 to establish electrical contact with one terminal of the coil.

The connector thus described provides a resilient connection between the roller and coil so that no shock is transmitted from the balance staff and/or roller through the coil or vice versa. The mounting of the connector is extremely simple and rapid and permits of proper alignment of the contact and trip jewel carried by the roller.

Figure 4:
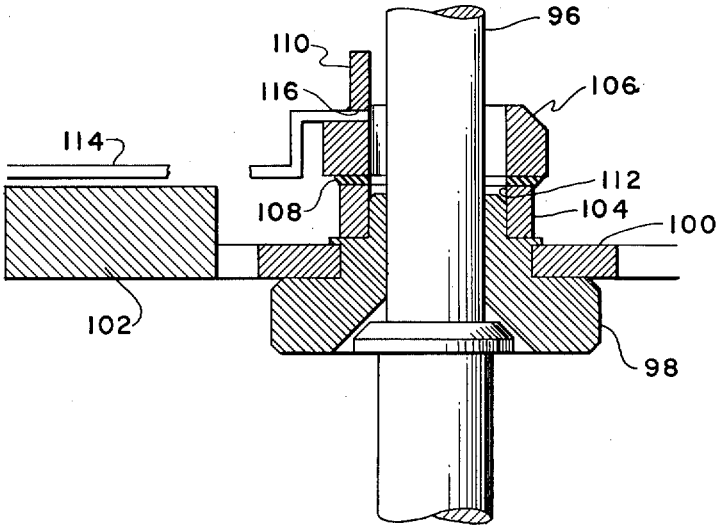
FIGURE 4 is a partial vertical section showing a balance wheel-coil contact assembly constructed according to another embodiment of the invention.

Referring now to FIGURE 4, there is shown another embodiment of the invention wherein a balance staff 96 carries a collet 98 upon which the cross arms 100 of a balance wheel are mounted. The balance wheel carries a coil 102 in the same manner as in the preceding embodiment of the invention. Also mounted on the collet 98 is a brass roller 104 of the same type as described in connection with the preceding embodiment of the invention.

According to the instant embodiment of the invention, the roller 104 has mounted thereon a gold alloy bushing 106 which is made from gold alloy tubing and is cemented to the roller by a cement layer 108 which may consist of an epoxy resin. This bushing is provided with an upstanding contact finger 110 which may be simply manufactured by milling the upper end of the bushing.

In mounting the bushing atop the roller, a hollow pin or sleeve is slipped over the upper end of the balance staff and fits into the top of the bore 112 in the roller 104. The bushing 106 is then slipped over the pin or sleeve to be centered thereby and may then be rotated so as to place the contact pin 110 in the proper position. The coil is provided with an elongated flexible lead 114 which terminates in an opening 116 in the side of the bushing 106 where it may be secured by any suitable means such as through the use of a T-shaped tongue at the end of the connector lead itself.

The bushing of this embodiment of the invention is quite easy to handle and is not subject to damage when scraping the contact face to provide optimum contact. It is possible to manufacture the gold alloy bushing complete on a watchmaker's lathe where the outside diameters can be turned, the center hole drilled and reamed, a cutter passed over the top face to leave the contact finger, and the hole in the side drilled.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a balance staff-mounted balance wheel and coil assembly for a battery operated electric watch, a balance wheel having a coil supported thereby *by resilient and flexible means,* [a] support *means* carried by said balance staff and having contact means thereon, a metallic core within said coil and connected to one terminal thereof, and a resilient *and flexible* connector electrically connecting said contact on said support means to said [metal] *metallic* core, said resilient connector terminating in an end portion resiliently locked within said [metal] *metallic* core to attach it thereto.

2. A balance wheel and coil assembly as set out in claim 1 wherein said coil is generally pie shaped having an arcuate outer side, a pair of substantially radial sides and a substantially straight inner side joining said radial sides, said [metal] *metallic* core comprising a strip of metal snugly fitting within said arcuate and radial sides and terminating in reversely bent ends where said radial sides meet said straight side, said end portion of said connector being locked within one of said reversely bent portions and the adjoining corner between the radial side and arcuate side of the [metal] *metallic* core.

3. A balance wheel and coil assembly as set out in claim 2 wherein said support means comprises a roller table having a trip jewel carried thereby and having apertures therein, said resilient connector terminating in a connector ring having apertures mating with said roller table apertures, and a member mounted over said connector ring having feet passing through said apertures in said connector ring in electrical contact therewith and entering said apertures in said roller table, a coating of an insulating cement between said connector ring and roller table and in said roller table apertures to provide electrical insulation between said roller table and connector ring and cementing said connector ring and member to said roller table.

4. A balance wheel coil-assembly as set out in claim 3 wherein said member comprises a contact plate carrying an upstanding contact.

5. In a balance staff-mounted balance wheel and coil assembly for a battery operated electric watch, a balance wheel having a coil supported thereby, a support carried by said balance staff and having at least one aligning aperture therein, a resilient connector electrically connected to one terminal of said coil and terminating in a connector end mounted atop said support and having an aperture therein mating with said support aligning aperture, and a contact member mounted atop said connector end and having a foot extending through said aperture in said connector end and into said aperture in said support to align said contact member, a coating of an insulating cement between said connector end and support and in said support aperture to provide electrical insulation between said support and said connector end and cementing said connector end and contact member to said support, and a contact upstanding from said contact member.

6. In a balance staff-mounted balance wheel and coil assembly for a battery operated electric watch, a balance wheel having a coil supported thereby, a roller table carried by said balance staff, a resilient connector electrically connected to one terminal of said coil and terminating in a connector plate encircling said balance staff, said connector plate and roller table having mating apertures therein, a contact plate mounted over said connector plate and having feet extending through said apertures in said connector plate in electrical contact therewith and into said apertures in said roller table, an insulating cementing material between said connector plate and roller table cementing said contact member and connector plate and roller table together and insulating said connector plate from said roller table, and a contact upstanding from said contact plate.

7. In a balance staff-mounted balance wheel and coil assembly for a battery operated electric watch, a balance wheel having a coil supported thereby, a roller table carried by said balance staff and having an opening at the top thereof concentric with the axis of said balance staff to define an annular space between the peripheral wall bounding said opening and the periphery of said balance staff, an annular contact member mounted atop said roller table about said balance staff and having a central opening concentric with the axis of said balance staff and providing an annular space between the peripheral wall bounding said opening and the periphery of said balance staff, the outer diameters of said annular spaces being substantially identical, said annular contact member being secured to said roller table by an insulating cementitious material, a contact finger upstanding from the upper end of said contact member, and a flexible connector electrically connecting said contact member to one terminal of said coil.

8. The assembly defined in claim 7 wherein said coil is yieldably supported by said balance wheel.

9. An electric watch including a balance staff; a balance wheel mounted on said balance staff; a coil yieldably mounted on said balance wheel; support means on said balance staff; contact means carried by said support means; and a [yieldable] *flexible and resilient* connector electrically connecting said contact means to one terminal of said coil, said coil being mounted on said balance wheel by means of a plurality of resilient *and flexible* arms.

10. An electric watch including a balance staff; a balance wheel mounted on said balance staff; a coil yieldably mounted on said balance wheel; support means on said balance staff; contact means carried by said support means; and a [yieldable] *flexible and resilient* connector electrically connecting said contact means to one terminal of said coil, said [yieldable] connector terminating in an end portion resiliently locked within said coil, said end portion making electrical contact with said terminal of said coil.

11. The watch defined in claim 10 *including a metal core within said coil,* wherein said end portion comprises a spring, said spring being resiliently bowed between two spaced locking surfaces [on said coil] *of said core.*

12. The watch defined in claim 11 wherein said coil is generally pie shaped having an arcuate outer side, a pair of substantially radial sides and a substantially straight inner side joining said radial sides, said metal core comprising a strip of metal snugly fitting within said arcuate and radial sides and terminatng in reversely bent ends where sad radial sides meet said straight side, said end portion of said connector being locked within one of said reversely bent portions and the adjoining corner between the radial side and arcuate side of the metal core.

*13. An electric watch including a balance assembly comprised of a balance wheel mounted on a balance staff and a support means on said balance staff carrying a contact means; a coil yieldably mounted on said balance wheel by means of a plurality of resilient flexible arms; and a connector electrically connecting said contact means to one terminal of said coil, said connector being rigidly connected to said balance assembly and to said coil with that portion of said connector which extends between said rigid connections being resilient and flexible.*

*14. An electric watch as set out in claim 13 wherein said resilient arms comprise substantially flat metal strips disposed in a plane generally perpendicular to said balance staff.*

*15. An electric watch as set out in claim 13 wherein said balance wheel includes an interrupted rim supported on said balance staff by a hub and cross bars extending from said hub to said rim, said resilient arms being connected to said cross bars.*

*16. An electric watch as set out in claim 15 wherein said coil is disposed between the ends of said interrupted rim.*

*17. An electric watch as set out in claim 15 wherein said coil has opposed curvate portions and said resilient arms are connected to said curvate portions substantially tangential thereto.*

*18. An electric watch as set out in claim 17 wherein said resilient arms are cemented to said curvate portions of said coil.*

References Cited in the file of this patent or the original patent

UNITED STATES PATENTS

| | | |
|---|---|---|
| 2,806,908 | Van Horn et al. | Sept. 17, 1957 |
| 2,883,827 | Ensign et al. | Apr. 28, 1959 |
| 2,952,117 | Reese et al. | Sept. 13, 1960 |